March 17, 1970  S. N. ROSCOE  3,501,765
INSTRUMENT LANDING DISPLAY SYSTEM
Filed April 29, 1968  5 Sheets-Sheet 1

INVENTOR.
STANLEY N. ROSCOE,
BY
J K Haskell
ATTORNEY.

March 17, 1970   S. N. ROSCOE   3,501,765
INSTRUMENT LANDING DISPLAY SYSTEM
Filed April 29, 1968   5 Sheets-Sheet 4
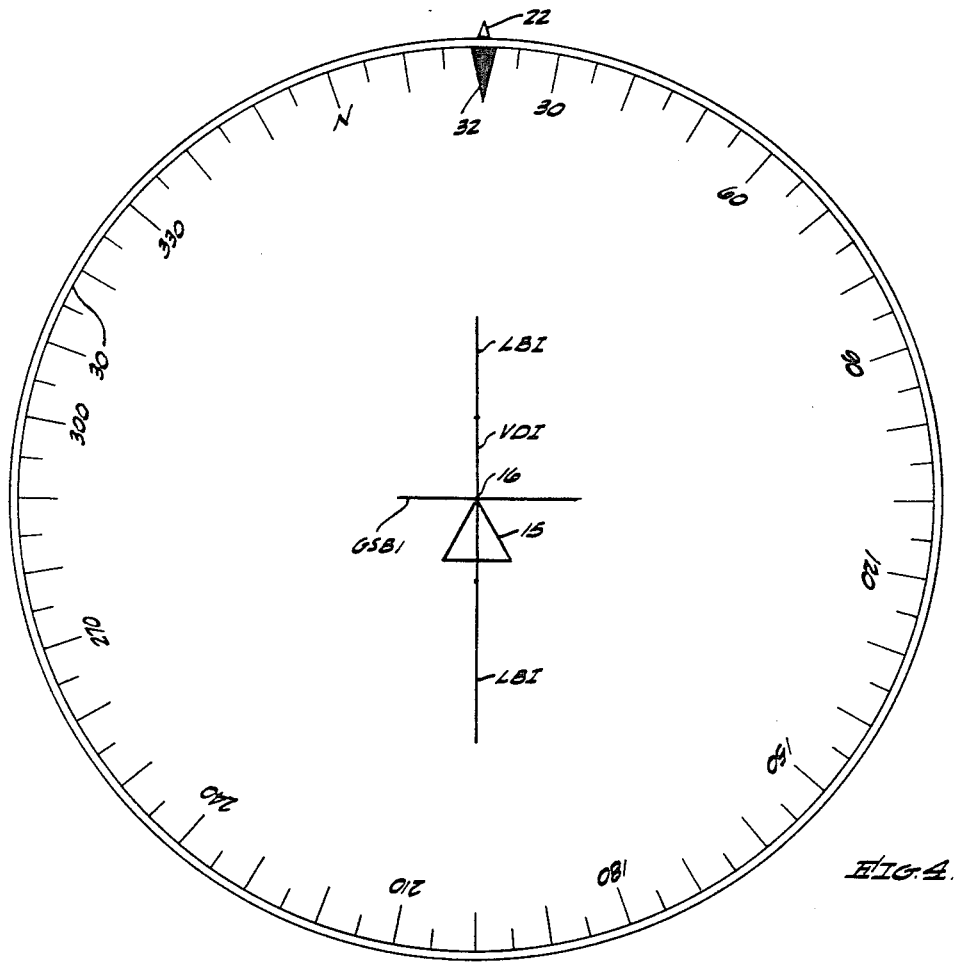
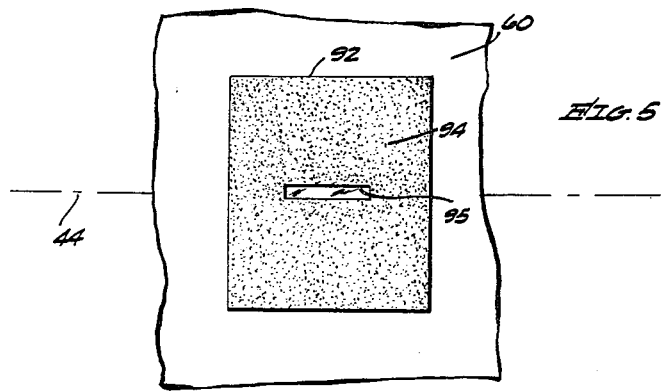

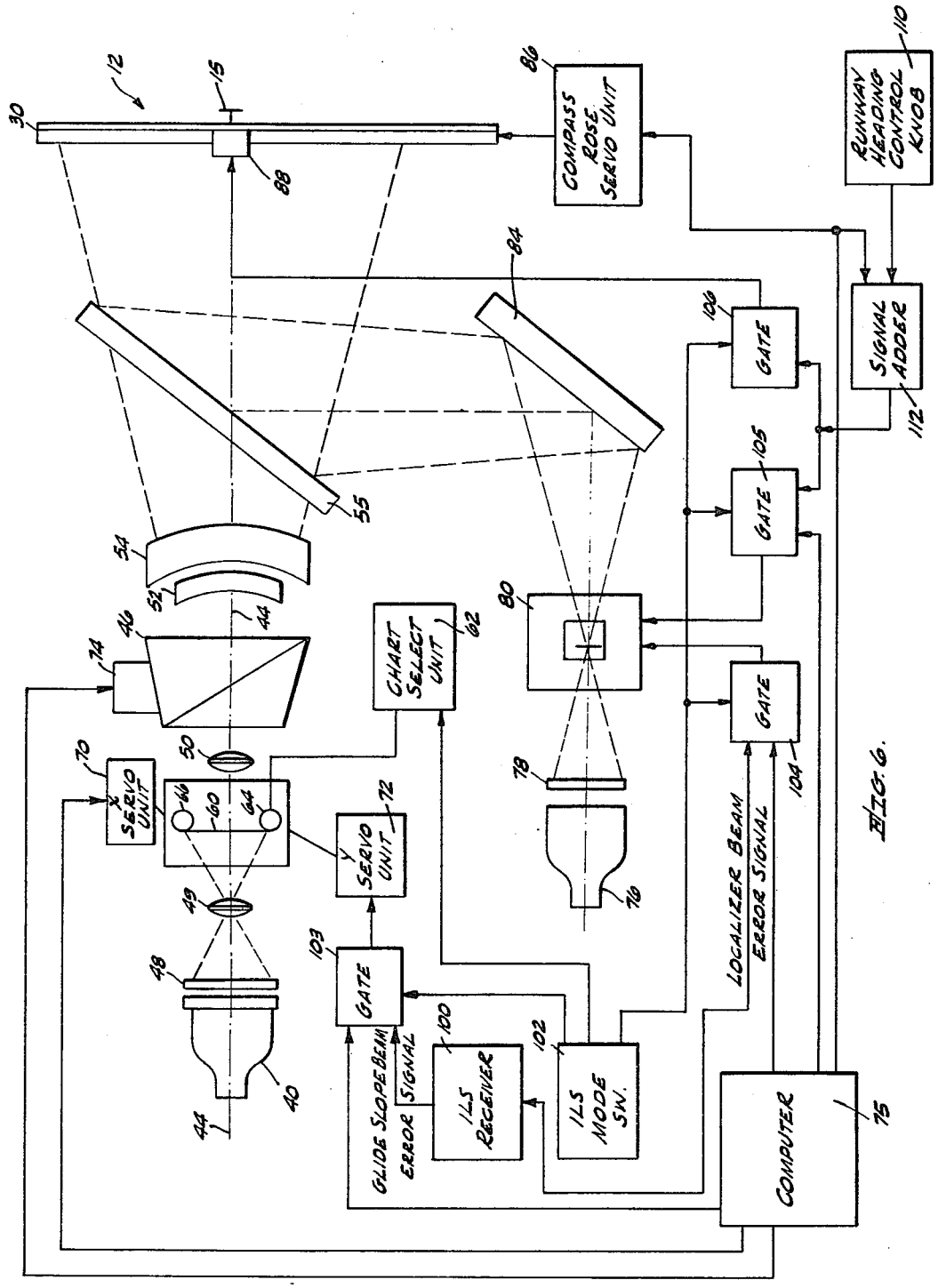

United States Patent Office 3,501,765
Patented Mar. 17, 1970

3,501,765
INSTRUMENT LANDING DISPLAY SYSTEM
Stanley N. Roscoe, Los Angeles, Calif., assignor to Hughes Aircraft Company, Culver City, Calif., a corporation of Delaware
Filed Apr. 29, 1968, Ser. No. 724,890
Int. Cl. G01s 1/16
U.S. Cl. 343—108                                10 Claims

ABSTRACT OF THE DISCLOSURE

A display system in which graphic indications, used during flight to indicate specific flight conditions and data, are used during an instrument-landing-system (ILS) mode to indicate aircraft lateral and vertical displacements from a localizer beam and a glide slope beam, respectively of an instrument landing system. The graphic indication, which during flight displays the aircraft displacement from a selected course, is slewed in the ILS mode to display the lateral displacement of the aircraft from the localizer beam, as well as the difference between the aircraft and runway headings. The hardware, which during flight is used to automatically slew a map so that the aircraft position thereon appears at the display center, is used in the ILS mode to display the aircraft vertical displacement from a glide-slope beam.

BACKGROUND OF THE INVENTION

Field of the invention

This invention relates to a flight navigation system and, more particularly, to a flight navigation system which utilizes a single display device for presentation of data processed during the flight of an aircraft and during the landing thereof.

Description of the prior art

In recent years, as aircraft performance has increased, the workload requirements of the crew have escalated greatly. An ever increasing portion of this workload has been assumed by computers and other signal processors, which are capable of processing large quantities of data, very rapidly, and output the data for use or interpretation by the crew. Often, the processed data is supplied to a display unit for display on a viewable surface.

Unfortunately, the advance made in the field of airborne navigation instrumentation have not followed a master plan, under which all necessary instruments are integrated in a master system. Rather, different instruments or systems have been designed as separate units to process and display only specific data. Consequently, at present, it is not uncommon to find a cockpit, crowded with several display units with their individual display surfaces on which different types of processed data are displayed. For example, several moving map display systems are commercially available. These systems are used, during the flight, to continuously and accurately display a map so that a true relation between the aircraft's position and the terrain over which it passes is accurately indicated. Such systems however, cannot be used to respond to instrument-landing-system-produced signals, which are designed to aid the pilot in the landing phase of a flight. Such signals are typically displayed on a separate display unit.

The multiplicity of such display units is of course highly undesirable, for many reasons. These reasons include higher initial cost, higher maintenance expenses and most importantly, increased workload of the crew and the increased likelihood of malfunctioning of any one of the multiple systems.

It is therefore apparent, that such disadvantages can be eliminated or at least minimized by providing a navigation system in which most, if not all, of the machine processed data is displayed on a single display surface. It is to provide such a system that the present invention is directed.

OBJECTS AND SUMMARY OF THE INVENTION

It is a primary object of the present invention to provide a new improved navigation system.

It is another object of the present invention to provide a navigation system with a multi-purpose display unit.

A further object of the present invention is to provide a navigation system in which a single display unit is employable during the flight and the landing of an aircraft.

Still a further object of the present invention is to provide a navigation system display unit in which certain graphical presentations are used to represent one type of processed data during flight and another type of processed data during landing.

These and other objects of the invention may be achieved by providing a navigation instrument system in which a single display surface of a display unit is used to display graphic presentation or symbols, which during different phases of the flight represent different conditions or data. At the center of a circular display surface an aircraft symbol is displayed. During the flight, the surface is used to continuously display a map, selected out of a plurality of maps, which are stored in a map container. The displayed map is continuously and accurately moved to display the true relation between the aircraft's position, represented by the center of the display and the terrain over whcih it passes.

A two-segment line, hereafter referred to as the route-segment indicator (RSI), which represents a chosen route or course between start and destination points which the aircraft is to follow, is displayed at an angular orientation, which corresponds to the route heading at the particular point in time. The RSI is displayed from the surface center at a distance which corresponds to the aircraft's off-route error. A magnified off-route error indication is provided by a vernier deviation indicator (VDI) which is also in the form of a line displayed parallel to the RSI at the distance from the center which is a multiple of the distance between the center and the RSI. A compass rose and other indicators or indexers, are also displayed. These include an aircraft heading indexer and a command heading indexer.

In accordance with the teachings of the present invention, in such a system, means are provided to switch the system to an instrument landing system (ILS) mode, when the aircraft approaches an airfield for landing, and a receiver aboard it is tuned to receive signals from a localizer beam and a glide slope beam of the ILS. As is appreciated by those familiar with ILS receivers, an ILS receiver produces a localizer beam error signal which represents the lateral displacement of an aircraft from the localizer beam which is aligned with the runway. Alternately stated, the beam's direction coincides with the runway heading. Likewise, the ILS receiver produces a glide slope beam error signal which represents the vertical distance between the aircraft and the glide slope beam.

In the system of the present invention when the navigation system is switched to an ILS mode, the RSI, which during the flight is used to display the selected route heading and the aircraft's off-route error, is used to display the runway heading and the lateral displacement of the aircraft from the localizer beam. Thus, in the ILS mode the RSI may be thought of as the localizer beam indicator, or LBI. The VDI, which during flight represents a magnified aircraft off-route error, in the ILS mode, it represents a magnified lateral displacement from the localizer beam. Manually-actuable means are provided to set the heading of the particular runway which the aircraft approaches.

As previously indicated, the navigation system in which the present invention is incorporated includes a container which stores a plurality of maps, one of which may be selected for display. In accordance with the teachings of this invention, the container stores an additional special-purpose mask or chart which defines a single line or bar. In the ILS mode, instead of displaying a map, the special-purpose mask is used to display a single line, which hereafter will be referred to as the glide slope beam indicator (GSBI). The glide slope beam error signal from the receiver is used to control the distance at which the GSBI is displayed from the display surface center and thereby represent the vertical displacement of the aircraft from the glide slope beam.

The novel features of the invention are set forth with particularly in the appended claims. The invention will best be understood from the following description when read in conjunction with the accompanying drawings.

BRIEF DESCRIPTION OF THE DRAWINGS

FIGURES 3 and 4 are front views of a display surface which displays graphic indications in accordance with the teachings of the present invention;

FIGURE 5 is a front view of a film frame used to project a glide-slope deviation indicator on the surface shown in FIGURES 3 or 4; and FIGURE 6 is a schematic and block diagram of a navigation display system which incorporates the teachings of the present invention.

DESCRIPTION OF THE PREFERRED EMBODIMENTS

As previously stated, the teachings of the present invention are directed to provide improvements in an existing navigation system with particular display characteristics. The improvements enable the system to operate in an ILS mode, in which error signals, received from an ILS receiver, are used to display the aircraft's lateral displacement and vertical displacement from the localizer and glide slope beams, respectively. Since the invention is closely related to the existing navigation system, the system will be described first in conjunction with FIGURES 1 and 2. Only thereafter will the novel aspects of the invention be described in detail.

Figure 1:
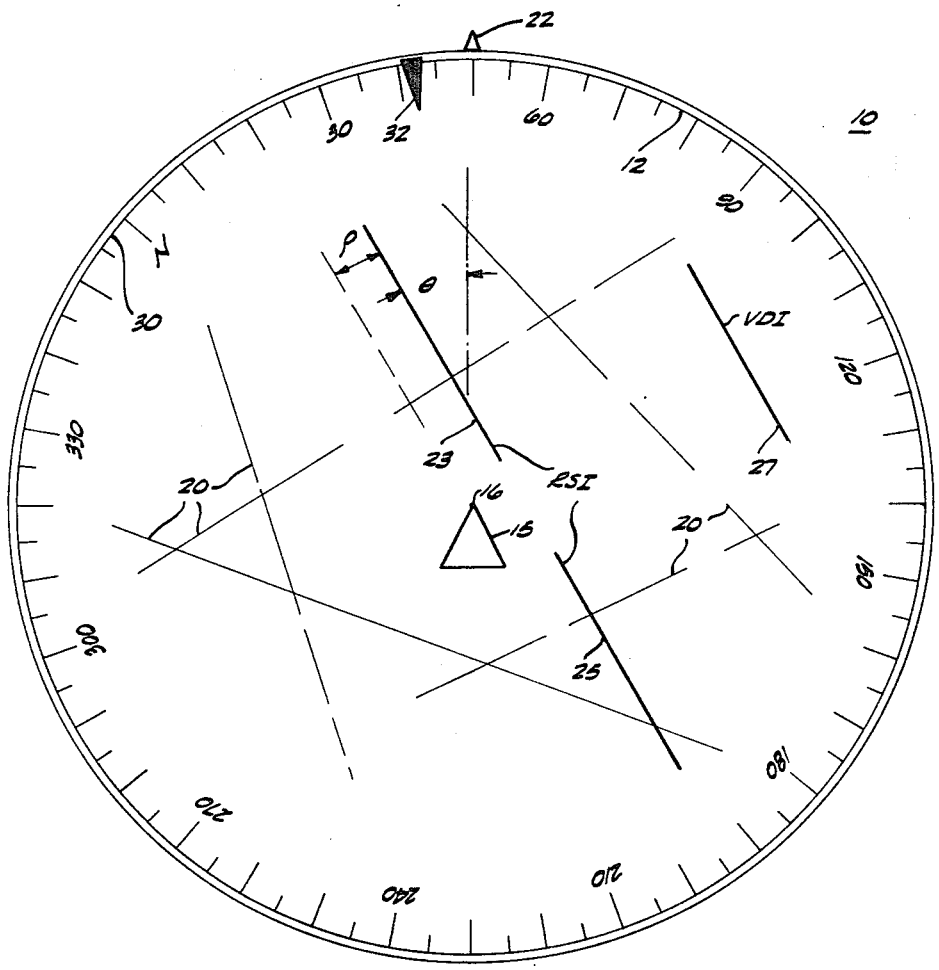
FIGURES 1 and 2 are diagrams useful in explaining an existing navigation display system.

Briefly, the present invention is incorporated in a navigation system which includes a display unit 10 (FIGURE 1), with a circular display surface 12. An aircraft symbol 15 is displayable at center 16 of the display surface. Lines 20 represent a navigation map or chart which, in the flight mode, is continuously and accurately moved with respect to center 16 so that the point on the map which represents the actual aircraft position is displayed at center 16. The aircraft heading is represented by an aircraft heading symbol 22 (FIGURE 1). As diagrammed in FIGURE 1, the display is assumed to be operated in a heading-up mode, in which symbol 22 is displayed at the top of surface 12.

The display surface 12 is also used to display a two-segment line 25 which as herebefore indicated represents a selected route over which the aircraft is to be flown. Line 25 which is the RSI, is displayed at a distance $\rho$ from center 16 which corresponds to the aircraft off-course error. The RSI is displayed at an angle $\theta$ with respect to the aircraft's heading, so that $\theta$ represents the heading difference between the selected course or route and the aircraft heading. A magnified off-course error is provided by line 27, which represents the vernier deviation indicator or VDI. The VDI is displayed parallel to the RSI and at a distance from center 16 which is a multiple of the distance $\rho$. A compass rose 30 is also displayed. In the heading-up mode, the angular orientation of the compass rose 30 is continuously controlled so that the marking thereon next to indicator 22 represents the aircraft heading.

During the flight, in the existing navigation system, the aircraft position is continually computed and, based on the selected route to be flown, a command heading is computed and displayed by indicator 32. The function of indicator 32 is to display to the pilot the necessary aircraft heading correction to lead the aircraft onto the selected route and maintain it thereon until the destination is reached.

Figure 2:
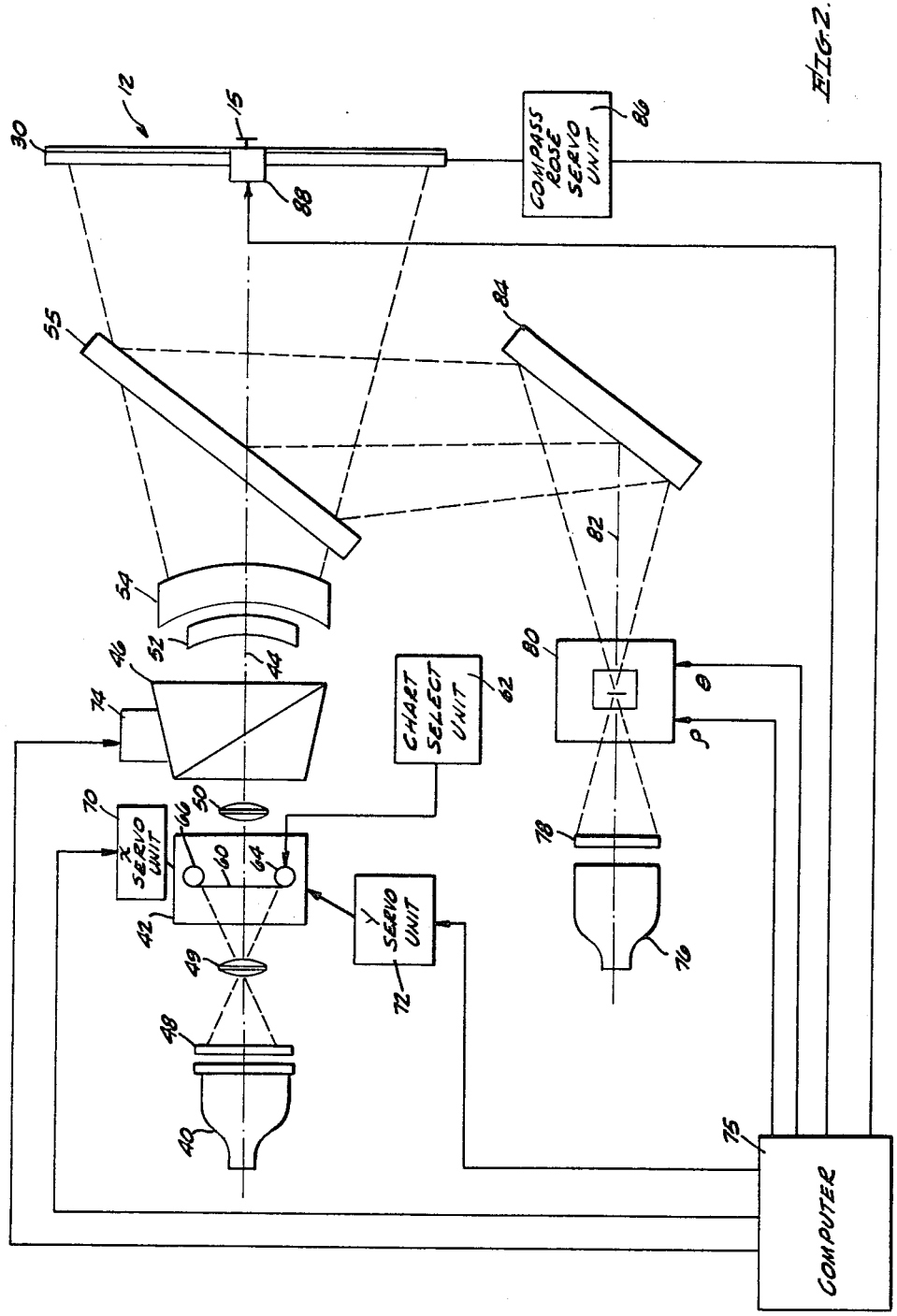

The circuits or arrangements which are required to produce the various displayed indications are diagrammed in FIGURE 2, wherein a projection lamp 40 is shown appropriately arranged in determined physical relation with a map container 42. The lamp and the container are optically aligned on an axis 44 with a Pechan prism structure 46, lens 48, focusing lenses 49 and 50, diverging lenses 52 and 54 and a light passing or semi-reflective mirror or mixer 55. The latter is angularly arranged in relation to the axis 44 so as to pass, as well as to reflect light to display surface 12. For example, the mirror 55 may have a transmissivity of 50% and a reflectivity of 50% of the applied light energy.

In FIGURE 2, numeral 60 designates a film strip, such as a 35 millimeter film which is assumed to contain the various maps to be displayed, with each map consisting of a frame on the film. The particular map to be displayed may be selected by means of a chart select unit 62 which drives the film between two spools 64 and 66 so that the chosen map is displayed with its center coinciding with the optical axis 44. The particular portion of the map which is to be displayed is controlled by moving the film container 42 with respect to optical axis 44 by means of an X servo unit 70 and a Y servo unit 72. Signals to these units are provided by a computer 75 which is assumed to receive all the necessary navigation signals from which the aircraft's actual position is determined. In FIGURE 2, the computer is also shown connected to a servo unit 74 which is assumed to control the orientation of the Pechan prism structure 46 about axis 44.

A second projection lamp 76 and a focusing lens 78 are included. Both are optically arranged with a symbol generator structure 80 along an optical axis 82. The function of generator 80 is to receive $\rho$ and $\theta$ signals from the computer in order to generate the RSI and VDI which are reflected to the display surface 12 by a mirror 84 and the mixer 55. The $\rho$ signal, supplied by the computer to the symbol generator 80, controls the distance at which the RSI is displayed from center 16, while the $\theta$ signal controls the angular orientation of the displayed RSI. The VDI display is controlled as a function of the display of the RSI. The display of the compass rose 30 is controlled by a compass rose servo unit 86, while the display of the command heading indicator 32 is controlled by an associated servo unit 88. Units 86 and 88 receive the appropriate signals from the computer 75.

In accordance with the teachings of the invention, the various symbols and indicators, which are displayed in the prior art system only during flight, are utilized during an ILS mode to display aircraft lateral and vertical displacements from localizer and glide slope beams, respectively. The functions which the symbols and the indicators perform in the ILS mode may best be described in conjunction with FIGURE 3 wherein, elements like those shown in FIGURE 1 are designated by like numerals.

Briefly, in the ILS mode, segmented line 25 is used to display the lateral displacement of the aircraft from the localizer beam. Therefore, the line may also be referred to as the localizer beam indicator or LBI. The distance $\rho$ of the LBI from center 16 is controlled by the localizer beam error signal provided by the ILS receiver. The LBI is displayed at an angle $\theta$ with respect to the aircraft heading which represents the difference between aircraft and runway headings. The VDI performs the same functions in the ILS mode that it performs in the conventional or flight mode of operation. That is, it provides a magnified indication of the displacement $\rho$. In the flight mode, the magnified indication represents magnified off-route error, while in the ILS mode it represents magnified aircraft lateral displacement from the localizer beam.

The heading of the runway which the aircraft approaches is manually set by a manually actuable control knob. In the arrangement diagrammed in FIGURE 3, a runway heading of 20° is assumed. The runway heading may be displayed in the ILS mode by using the command heading indicator 32 (FIGURE 1) as a runway heading indicator. In the heading-up display mode (as shown) the aircraft symbol 15 and the aircraft heading indicator 22 are fixedly aligned in the vertical direction and the compass rose 30, and the runway heading marker 32 move together as a function of aircraft heading changes.

In addition, in the ILS mode the display surface 12 is used to display a line 90 at a distance from center 16 which corresponds to the vertical displacement $\delta$ of the aircraft from the ILS glide slope beam. Thus, line 90 may be thought of as the glide slope beam indicator, GSBI.

Such a display arrangement is very useful since it enables a pilot to capture and follow ILS glide slope and localizer beams in order to execute an accurate approach to a landing. When the approach is properly executed the LBI, VDI and GSBI appear on the surface 12 as shown in FIGURE 4.

In order to minimize the circuits necessary to operate the display unit in the ILS mode, the arrangement which is used to project the map (lines 20) in the flight mode is utilized in the ILS mode to project the GSBI. This is accomplished by providing the film 60 with a special-purpose frame, which is designated in FIGURE 5 by numeral 92. The frame has an opaque surface 94 except for a bar-like transparent portion 95 at its center. In the ILS mode, frame 92 is chosen for display. The glide slope error signal from the ILS receiver is supplied to the Y servo unit 72 of the film container 42 in order to control the displacement of the frame center line from the optical axis 44.

Reference is now made to FIGURE 6 in which all the circuits previously described in conjunction with FIGURE 2 are shown together with the circuits, which provide the system with the added capability of operating in the ILS mode. In FIGURE 6, numeral 100 represents an ILS receiver of the type capable of providing glide slope beam and localizer beam error signals. The circuits needed to provide the capability of operating in the ILS mode include an ILS mode switch 102 and four control gates 103 through 106 which are controlled by switch 102. The outputs of gates 103 and 106 control the Y servo unit 72 and the servo unit 88, respectively. The latter controls the display of indicator 32, which in the ILS mode represents runway heading. The outputs of gates 104 and 105 are supplied to the symbol generator 80 to control the displacement $\rho$ and angle $\theta$ at which the LBI is displayed.

In other than the ILS mode the gates output the signals which they receive from computer 75. Thus, the arrangement in FIGURE 6 operates in a manner identical with the operation of the arrangement shown in FIGURE 2. However, in the ILS mode the gates are controlled by switch 102 to output the signals which are supplied to them from sources other than the computer 75.

For example, in the ILS mode, gate 103 supplies the glide slope beam error signal, received from ILS receiver 100, to unit 72 rather than a map Y position signal from the computer. The signal which is received by unit 72 from receiver 100 through gate 103 is utilized to control the Y displacement of mask 92 (FIGURE 5), which in turn affects the vertical displacement $\delta$ of the GSBI from the center of surface 12 (see FIGURE 3). Similarly, in the ILS mode gate 104 outputs the localizer beam error signal, which is received from the ILS receiver 100. The output of gate 104 controls the displacement or distance $\rho$ between center 16 and the two-segment line 25. In the ILS mode this line is the LBI and $\rho$ represents aircraft lateral displacement from the localizer beam.

As seen from FIGURE 6, the system of the invention incorporates a runway-heading-defining unit 110 whose output is supplied to one input of a signal adder 112. The other input to unit 112 is the signal which is supplied from the computer to the compass rose servo unit 86. The latter signal is actually the signal which represents the aircraft's heading with respect to magnetic NORTH. The function of runway-heading-defining unit 110 is to supply a manually set bias signal, such as a voltage to represent the runway heading, so that the runway heading indexer 32 (FIGURE 3) and the LBI are displayed at a radial direction with respect to NORTH on compass rose 30 which corresponds to the runway heading or bearing.

Figure 3:
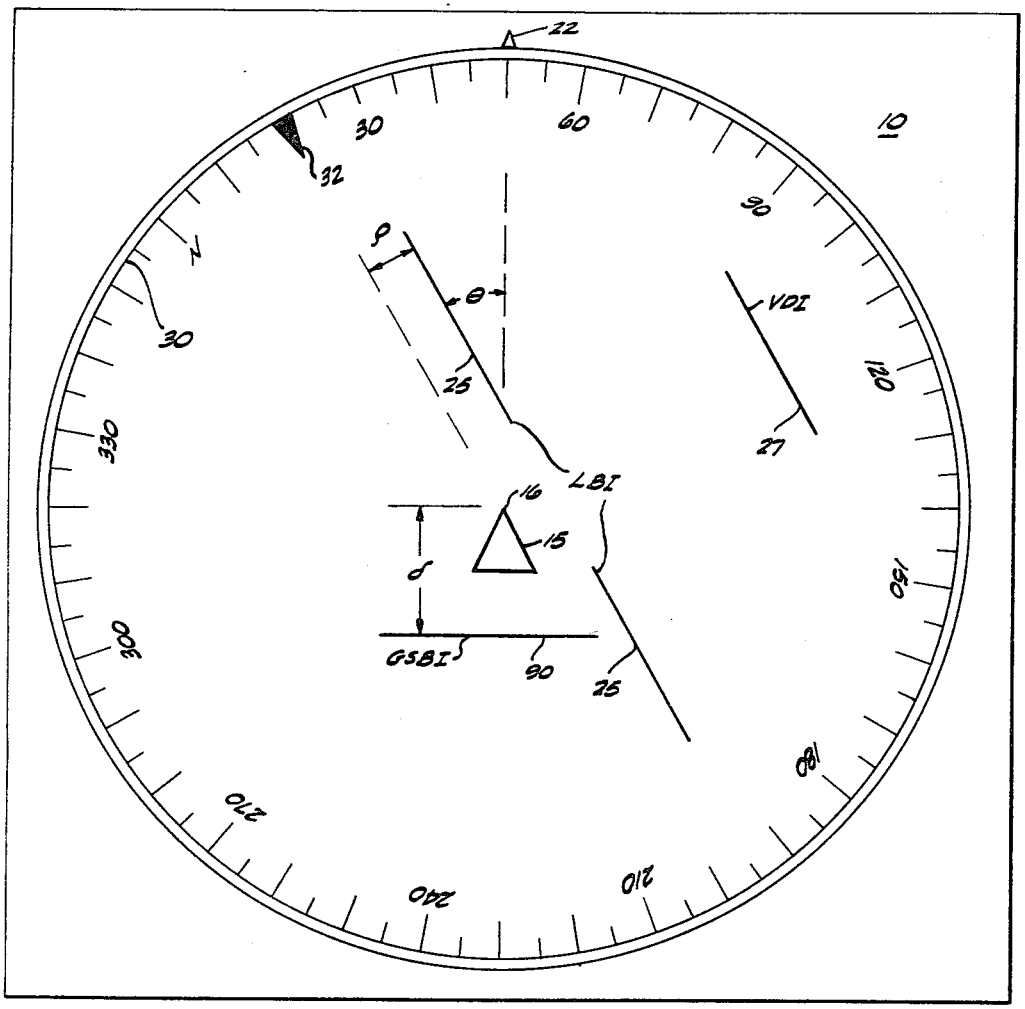

For the example diagrammed in FIGURE 3, in which the runway heading is assumed to be 20°, unit 110 is set by the pilot to supply a 20° bias signal so that the indexer 32 is displayed at the 20° mark on the compass rose 30 and the LBI is displayed in a direction which is parallel to the radial direction of the indexer 32. This is accomplished by supplying the output of the signal adder 112 through gate 105 to the symbol generator 80 to control the angle $\theta$. Likewise, the signal added 112 output is supplied through gate 106 to servo unit 88 to control the radial direction at which the runway heading indexer 32 is displayed.

In the foregoing, the invention has been explained in connection with a heading-up display mode. It should be appreciated, however, that though such a display mode is generally preferred by pilots, the invention is not limited thereto. If desired, the various graphic presentations may be presented or displayed in a NORTH-up display mode. In such a mode the compass rose 30 would be fixedly displayed with NORTH pointing up, and the runway heading indexer 32 and the radial direction of the LBI would be displayed in a direction corresponding to the runway heading. The actual aircraft heading would be reflected by the changing position of marker 22 and the orientation of the aircraft symbol 15. Also, the GSBI may be rotated so as to be displayed at a direction perpendicular to the aircraft heading direction of the display surface 12.

There has accordingly been shown and described herein a novel system for displaying the lateral and vertical displacements of an aircraft from the localizer and glide scope beams respectively, of an instrument landing system. In practice, the invention utilizes the instrumentation and display characteristics of an existing navigation system to display the lateral and vertical displacements without requiring a separate display unit and related optical and electromechanical devices. The teachings of the invention are implementable with the addition of a minimum number of gates and other circuits.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. In a navigation system of the type including a display unit with a display surface having a center point representing the position of an aircraft, said navigation system further including, first means for displaying a first line at a distance from said center which corresponds to the distance of the aircraft from a selected route to be followed, and second means which include means storing a plurality of maps for selectively and controllably displaying one of the stored maps on said surface with the point on the map which represents the aircraft position being displayed at said center, an improvement comprising: first control means for energizing said first means with signals which represent aircraft heading of a runway and a localizer beam error signal which represents the lateral displacement of the aircraft from a localizer beam aligned with said runway heading to display said first line at a distance from said center which corresponds to the aircraft's lateral displacement from said localizer beam and in a radial direction which forms an angle with a radial direction which represents the aircraft's heading, said angle corresponding to the difference between the aircraft and runway headings.

2. The improvement as recited in claim 1 further including second control means utilizing said second means for displaying a second line on said surface at a distance from said center which corresponds to the vertical displacement of said aircraft from a glide slope beam of an instrument landing system, associated with said runway.

3. The improvement as recited in claim 2 wherein said means for storing a plurality of maps further stores a mask defining a line, said mask being displayable in an instrument landing system mode of operation, said improvement including means for varying in response to a glide slope error signal from an instrument-landing-system receiver on board said aircraft, the displacement of the line in said mask with respect to a selected optical axis to control the displayed distance between said center and said second line.

4. The improvement as recited in claim 3 further including means displaying a third line parallel said first line at a distance from said center which represent a magnified lateral displacement of said aircraft from said localizer beam.

5. In a navigation system of the type including a display unit with a display surface having a center which represents the position of an aircraft, said system being operable in a flight mode in which first means display on said surface a first line which represents a selected route which said aircraft is to follow from a start point to a destination point, said first line being displayed at a distance from said center which corresponds to the aircraft's off-route error and at a radial direction which forms an angle $\theta$ with respect to a radial direction which defines the aircraft's heading, $\theta$ representing the difference between the aircraft's and route headings, said navigation system further including second means which comprise of means storing a plurality of navigation maps, means for selecting a map for display on said surface and means for controlling the position of said means for storing with respect to a selected optical axis to cause the point on the displayed map which corresponds to the aircraft position to be displayed at said center, an arrangement for utilizing said first and second means in an instrument-landing-system mode to display on said surface at least the lateral displacement of said aircraft from a localizer beam of an instrument landing system operative at an airport which said aircraft approaches for a landing, the arrangement comprising:

an instrument-landing-system receiver aboard said aircraft for providing a lateral displacement error signal which represents the lateral displacement of said aircraft from the instrument-landing-system localizer beam directed in a heading corresponding to the heading of the airport runway;

mode control means for controlling said system to operate in an instrument-landing-system mode; and first control means responsive to an aircraft heading signal, a manually set runway heading signal and a localizer beam error signal from said instrument-landing-system receiver, for controlling in said instrument-landing-system mode said first means to display said first line at a distance from said center which corresponds to the lateral displacement of said aircraft from said localizer beam and at an angle with respect to the aircraft heading direction which corresponds to the difference between the aircraft and runway headings.

6. The arrangement as recited in claim 5 wherein said instrument-landing-system receiver further provides a glide slope beam error signal which represents the vertical displacement of said aircraft from a glide slope beam of said instrument landing system, and second control means being responsive to said glide slope beam error signal for displaying a vertical displacement indication on said surface at a distance from said center which is related to said vertical displacement.

7. The arrangement as recited in claim 6 wherein said first control means further include means displaying a second line parallel said first line at a distance from said center which represents a magnified aircraft lateral displacement.

8. The arrangement as recited in claim 7 wherein said second control means include a mask which is stored in said means for storing, and is displayed on said surface in said instrument-landing-system mode, said mask having a surface which when projected on said display surface produces said vertical displacement indication.

9. The arrangement as recited in claim 8 wherein a portion of said mask surface defines a line which when projected on said display surface produces a third line, and means for controlling said means for storing so that in the instrument-landing-system mode said third line is displayed in a direction perpendicular to the aircraft heading direction and at a distance from said center which corresponds to the aircraft's vertical displacement from the glide slope beam.

10. The arrangement as recited in claim 6 wherein said second control means include a mask which is stored in said means for storing, and is displayed on said surface in said instrument-landing-system mode, said mask having a surface which when projected on said display surface produces said vertical displacement indication.

References Cited

UNITED STATES PATENTS

| 2,880,414 | 3/1959 | Snodgrass | 343—108 X |
| 2,932,024 | 4/1960 | Sant Angelo | 343—108 |
| 2,943,482 | 7/1960 | Fritze | 343—108 |
| 2,946,053 | 7/1960 | Dayton | 343—108 |
| 3,178,704 | 4/1965 | Moore et al. | |
| 3,225,350 | 12/1965 | Fernandez. | |

RODNEY D. BENNETT, JR., Primary Examiner

HERBERT C. WAMSLEY, Assistant Examiner

U.S. Cl. X.R.

340—27; 343—112